(12) United States Patent
Miller

(10) Patent No.: US 6,205,878 B1
(45) Date of Patent: Mar. 27, 2001

(54) BALL ROLLER SPINDLE

(76) Inventor: Franz Georg Miller, August Laemmleweg 10, Leonberg (DE)

( * ) Notice: Subject to any disclaimer, the term of this patent is extended or adjusted under 35 U.S.C. 154(b) by 0 days.

(21) Appl. No.: 09/324,321

(22) Filed: Jun. 2, 1999

(30) Foreign Application Priority Data

Jun. 9, 1998 (DE) .............................. 198 25 769

(51) Int. Cl.$^7$ ................................. F16H 25/12
(52) U.S. Cl. .................. 74/441; 74/424.8 NA; 74/459
(58) Field of Search ................. 74/424.8 NA, 74/424.8 R, 89.15, 459, 441

(56) References Cited

U.S. PATENT DOCUMENTS

| 3,062,070 | * | 11/1962 | Beatty et al. | ............................ 74/459 |
| 4,198,872 | * | 4/1980 | Metz | ............................ 74/424.8 R X |
| 4,821,592 | * | 4/1989 | Rousselot | .................... 74/424.8 NA |
| 5,241,874 | * | 9/1993 | Matsuhama | .................. 74/424.8 NA |

FOREIGN PATENT DOCUMENTS

| 348847 | 2/1922 | (DE) . |
| 1425174 | 9/1969 | (DE) . |
| 2231541 | 1/1974 | (DE) . |
| 9400721 | 3/1995 | (DE) . |
| 4334477 | 4/1995 | (DE) . |
| 0337418 | 10/1989 | (EP) . |

* cited by examiner

*Primary Examiner*—Richard M. Lorence
(74) *Attorney, Agent, or Firm*—Jordan and Hamburg LLP

(57) ABSTRACT

An apparatus for converting a rotational movement into a back and forth movement is described, which has a spindle with an outer surface having at least one guiding groove, a bearing body with a wall section surrounding the surface concentrically and a force transfer device with at least one ball mechanism comprising at least one driving ball. The spindle and the bearing body are disposed so that they can be rotated and shifted axially relative to one another. The ball mechanism is mounted in a bearing bore in the wall section and protrudes into the guiding groove as well as towards the outside over the outer extent of the wall section. Moreover, at least one ball race, pretensioning the ball mechanism in the direction of the guiding groove, is slipped onto the bearing body. Pursuant to the invention, the ball race has at least one driving ball bearing surface, which is disposed essentially concentrically to the wall section and an arresting mechanism, by means of which the ball race can be fixed in position with respect to an axial movement relative to the ball mechanism.

19 Claims, 4 Drawing Sheets

BALL ROLLER SPINDLE

BACKGROUND OF THE INVENTION

The invention relates to an apparatus, which converts a rotational movement into a back and forth movement and is also referred to as a ball roller spindle.

In German Patent Application No. G 94 00 721.7, an apparatus is described for converting a rotational movement into a back and forth lifting motion or the reverse. The known apparatus has a spindle with at least one guiding groove in an outer surface, a bearing body and a force transfer device with a ball mechanism. The spindle and the bearing body are disposed so that they can be shifted rotationally as well as axially relative to one another. The ball mechanism is mounted in a continuous borehole in the bearing body in such a manner that it protrudes into the guiding groove on one side and, on an opposite side, protrudes towards the outside over the wall section of the bearing body. A ball race is fitted onto the bearing body and supported at the ball mechanism, placing the latter under tension in the direction of the guiding groove. In order to prevent the ball race from being pushed in an axial direction out of a region of the ball mechanism with a result of releasing driving balls of the ball mechanism, either a groove, V-shaped in cross section, is provided in an inner surface of the ball race or the apparatus is only intended for smaller lifts for the known mechanisms for each ball mechanism of the majority of ball mechanisms.

Moreover, an apparatus for controlling valves, robots or tool machines is described in European Patent Application No. EP 0 337 418 A1. For this known apparatus, a ball mechanism is supported in a guiding groove of a spindle and in an axial groove of a housing enclosing the spindle and bearing body. At the same time, the spindle is mounted rotatably in a housing. The known apparatus can be used in a variety of ways to effect relative motions between the spindle, the bearing body and the housing or for equipment produced from these structural elements, such as metering pumps. However, these devices have a comparatively complicated construction and therefore are relatively expensive to manufacture.

SUMMARY OF THE INVENTION

An object of the present invention is to provide an apparatus which converts a rotational movement into a back and forth movement, reliably prevents an axial shift of a ball race relative to a ball mechanism, and has a simple structure with a cost of manufacturing less than that of manufacturing known systems.

This objective is accomplished with an apparatus in which the ball race has at least one driving ball bearing surface which is disposed essentially concentrically to the wall section and an arresting mechanism for fixing the ball race in position with respect to an axial movement relative to the ball mechanism.

The apparatus for converting a rotational movement into a back and forth movement has a spindle with an outer surface having at least one guiding groove, a bearing body with a wall section surrounding the outer surface of the spindle concentrically, and a force transfer device with at least one ball mechanism, comprising at least one driving ball.

The spindle and bearing body are disposed, so that they can be rotated and shifted axially relative to one another. The ball mechanism is mounted in a bearing bore in the wall section and protrudes into the guiding groove as well as through the wall section. A ball race, which biases at least one ball mechanism toward the guiding groove, is fitted onto the bearing body.

Pursuant to the invention, the ball race has at least one driving ball bearing surface, disposed essentially concentrically with respect to the wall section, and one arresting mechanism.

With respect to axial movement of the ball race relative to the ball mechanism, the position of the ball race is fixed by means of the arresting mechanism.

The driving ball bearing surface, disposed concentrically to the wall section of the bearing body, can be produced with little technological effort and therefore relatively inexpensively. In order to prevent axial shifting of such a ball race having a cylindrical inner surface, which can be easily manufactured, from a rolling region of the ball mechanism, the ball race has an arresting mechanism, which prevents relative axial motion between the ball race and the bearing body. By these means, it is ensured that the driving balls of the ball mechanism are not released under any circumstances by the cylindrical inner surface supporting the ball mechanism, so that they cannot fall or cannot be driven out of the bearing bore of the bearing body.

Moreover, the driving balls, guided or taken up in the bearing bore, are disposed so that a driving ball is guided in a guiding groove of the spindle and in the bearing bore and the driving ball above is guided at the inner cylindrical surface and in the bearing bore. Instead of a double ball arrangement, a single driving ball which is guided supported in the guiding groove of the spindle, the bearing bore of the bearing body, and the cylindrical inner surface of the ball race is optionally provided. The bearing bore in the bearing body for use with the single ball is to be constructed with a correspondingly larger diameter. However, an advantage is that only a single driving ball is sufficient for the ball mechanism.

Preferably, the arresting mechanism of the ball race has at least one ring shoulder in a region of end faces of the ball race. The ring shoulder has a diameter, which is smaller than a diameter of the driving ball bearing surface, so that an inner shoulder is formed at the ring shoulder in a front end region of the latter, with which the driving ball, facing the respective shoulder, is in contact. By these means, an axial shifting of the ball race relative to the ball mechanism is prevented. Since preferably several ball mechanisms are to be provided, especially in the case of ball races with a relatively large axial length, and the bearing body has several bearing bores for accommodating such ball mechanisms, it is not necessary, when the respective shoulders are present in the end face regions of the arresting mechanism, that the driving balls of the ball mechanism, guided between the outer shoulders at the inner shoulders, have an additional lateral guide. Rather, it is sufficient that the ball mechanisms, lying between the ball mechanisms, which are the outer ball mechanisms in the longitudinal direction, are supported only at the inner cylindrical surface of the ball race. It is, however, also possible that the driving ball bearing surface, disposed concentrically to the wall section of the bearing body, has small, flat groove-like ball bearing surfaces, so that, preferably for each ball mechanism which lies between the ball bearing surfaces in contact with the inner shoulders, there is at least a slight guidance to prevent axial movement of the ball race relative to the ball mechanism.

In accordance with a further preferred example, the arresting mechanism of the ball race is constructed as an inclined surface, a direction of which is inclined with respect to the longitudinal axis of the spindle. The inclined surface, forming the actual inner shoulder, represents a conical section surface, so that the driving balls of the ball mechanism, lying furthest towards the outside and contacting this inner shoulder, have at least a theoretically pointwise contact, which is particularly advantageous from the point of view of friction.

In accordance with a further development, however, it is also possible that a shape of the inner shoulder is essentially congruent with a surface of the driving ball. This means that the surface of the inner shoulder is constructed so that it is in contact with the surface of the driving ball of the respective ball mechanism, as a result of which the guidance for the driving balls is particularly good.

Preferably, at least one of the two ring shoulders is connected integrally with the ball race. It is, however, also possible that both ring shoulders are connected integrally with the ball race. In the latter case, the spindle, ball mechanism, bearing body and ball race are installed in such a manner that, initially, the ball race is pushed over the bearing body in the region of the bearing bores, that appropriate driving balls of the ball mechanism are placed in the guiding groove of the spindle and that the bearing bores in the bearing body are gradually "filled" with the driving balls of the ball mechanism. After the driving balls are installed, an axial shifting of the ball race relative to the bearing body is no longer possible, since the internal distance between the inner shoulders is dimensioned so that the respectively outer ball mechanisms barely lie with their driving balls against the inner shoulders.

In accordance with a further example, at least one of the two ring shoulders is fastened detachably as an insert piece at the ball race. Preferably, this insert piece consists of a wear-resistant material. If the apparatus is constructed with at least one ring shoulder of the ball race, which is fastened so that it can be detached, it is possible to insert the spindle in the bearing body and then to insert the driving balls in the bearing bores of the bearing body, after which the ball race is pushed over the region of the ball mechanism, whereupon the ring shoulder is fastened to the ball race, so that the latter is prevented from moving axially relative to the bearing body.

In accordance with a further example, the ball race is constructed slotted along a longitudinal direction as a locking ring, which can be placed under tension by means of a tensioning element. By these means, it is possible to adjust the tension on the ball race to the desired value. Moreover, it is possible to provide a split ball race, so that each individual driving ball of the ball mechanism has its own locking ring, which is constructed likewise as a locking ring. A ball race, provided individually for each ball mechanism, can also be constructed integrally with the ring shoulders as well as in a divided construction.

To compensate for tolerances, the outer ball can be used with a different diameter, such as a smaller diameter in the $\mu$ range, in order to achieve the running properties desired.

BRIEF DESCRIPTION OF THE DRAWINGS

Further advantages and distinguishing features of and possibilities for applying the invention are explained in detail with reference to the enclosed drawings, in which.

DETAILED DESCRIPTION

Figure 1:
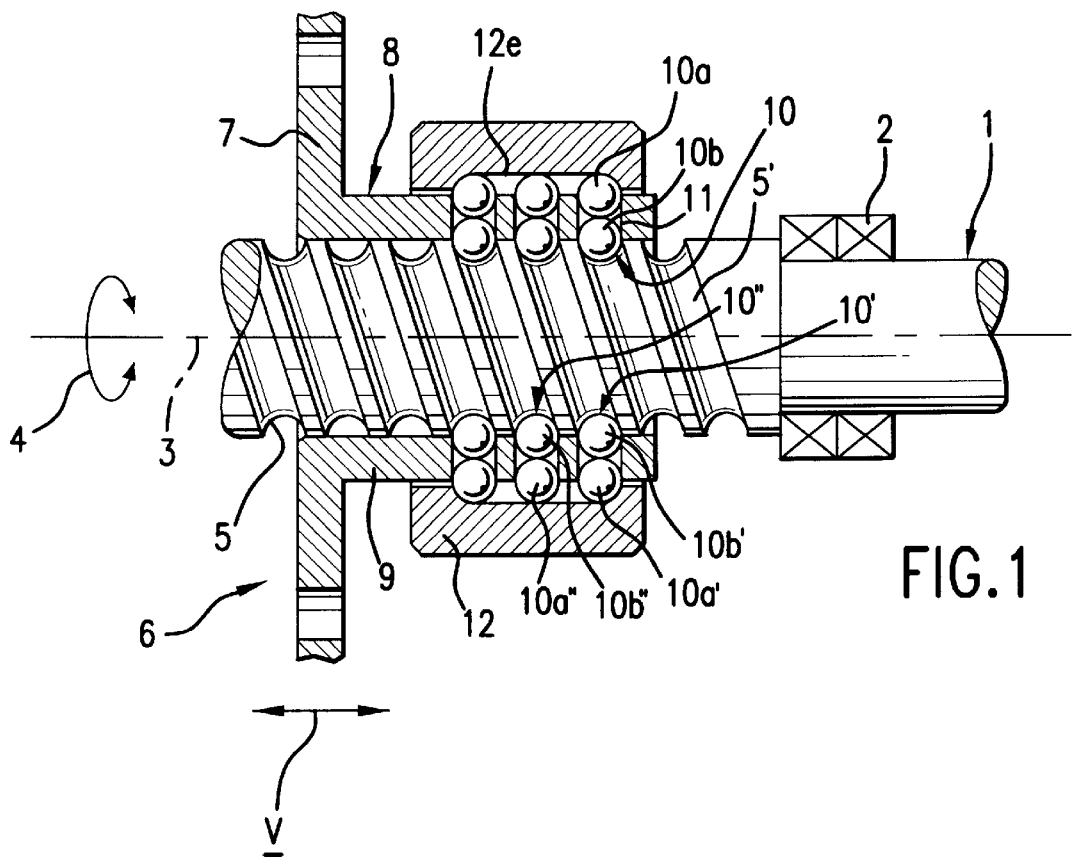
FIG. 1 shows an example of an inventive ball roller spindle with a ball race in one piece.

In FIG. 1, a first example of a ball roller spindle is shown for converting a rotational movement into a back and forth lifting motion. The ball roller spindle has a centrally disposed spindle 1 (rotating part), which is mounted in a frame, which is not shown, such as a machine tool, by means of bearings 2 constructed, for example, as thrust bearings, axially displaceable. The spindle 1 can thus be rotated back and forth about an axis of rotation in the directions given by means of the double arrow 4.

The spindle 1 has a region in which two parallel guiding grooves 5 and 5', circling a longitudinal axis 3 in helical fashion, are incorporated in an outer surface. A size of the region of the spindle 1, in which the guiding grooves 5 and 5' are incorporated, or their lengths, depend on a desired adjusting path of the lifting motion, on the forces to be transferred, on their slopes, and on the desired transformation ratio.

The apparatus of FIG. 1 furthermore contains a lifting part 6, which serves for connecting to a part, such as a carriage of a machine tool, which moves back and forth and is also not shown. The lifting part 6 has a flange 7, which is connected or can be connected to the part to be moved, and a bearing body 8, which is fastened in one piece or detachably to the flange 7 and which furthermore has a sleeve with a cylindrical wall section 9. An internal diameter of the cylindrical wall section 9 corresponds in the region of the guiding grooves 5, 5' essentially to an external diameter of the spindle 1. By these means, the bearing body 8, without requiring additional bearings, is centered and guided on the spindle 1 without clearance and mounted so that it can be shifted axially and rotated relative to the spindle 1. However, because it is fastened to the carriage, the bearing body 8 in this example cannot be rotated relative to the machine tool or the like.

Aside from the guiding grooves 5, 5', a force transfer device contains at least one driving mechanism, which is formed in this example as a ball mechanism 10, 10'. Moreover, in one part of the wall section 9, a thickness of which is less than a thickness of the ball mechanism 10, 10', the force transfer device has at least one continuous bearing bore 11, which is assigned to the ball mechanism 10, 10'. The ball mechanism 10, 10', moreover, is disposed in the bearing bore 11 in such a manner that it protrudes into the guiding grooves 5 and 5', respectively, and, on the opposite side, it protrudes radially through the wall section 9 having the bearing bore 11. In the case of the example described, this is accomplished for the ball mechanism 10, having two driving elements in the form of driving balls 10a and 10b, by disposing the two driving balls 10a and 10b axially behind one another in the bearing bore 11, the inner driving ball 10b protruding about halfway into the guiding groove 5, whereas the outer driving ball 10a protrudes radially outwards about halfway out of the bearing bore 11. The outer driving ball 10a is supported at a driving ball bearing surface 12e of a ball race 12, which is disposed concentrically with respect to the wall section 9.

The guiding grooves 5, 5' and the essentially concentrically formed driving ball bearing surface 12e are constructed in such a manner or are at such a distance from one another, that the driving balls 10a, 10b, lie against one another at their mutually facing sides in the bearing bore 11. In the case of this example, the guiding grooves 5, 5' have a semicircular cross section, a radius of which corresponds essentially to a radius of the driving balls 10a, 10b. Finally, the diameter of the bearing bore 11 is selected to correspond essentially to the diameter of the driving balls 10a and 10b, so that the driving balls 10a, 10b are supported essentially without clearance in the bearing body 8. The corresponding applies for the ball mechanism 10' with the driving balls 10a', 10b'.

The ball race 12 consists of a cylindrical sleeve, which is disposed coaxially to the longitudinal axis 3, with the cylindrically constructed ball bearing surface 12e, which is disposed concentrically to the wall section 9 and at which the driving balls are supported or on which they roll. The dimensions of the ball race are such that the driving balls are supported at the guiding grooves 5, 5' and at the driving ball bearing surface 12e and biased between the two in such a manner that the two driving balls 10a,10b or 10a',10b' transfer forces from the spindle 1 largely without clearance to the lifting part 6. As a result, the lifting part 6 can follow the spindle movement directly even if there is a change in the direction of rotation. At the same time, the bias force is selected so that there is not excessive friction. This is achieved, above all, due to the fact that pairs of the driving balls 10a,10b or 10a',10b' are used.

An advantage of the ball roller spindle is that the manufacture of an apparatus, which overcomes the disadvantages of the apparatus of the state of the art and which satisfies all requirements, which could be fulfilled previously only by a ball roller spindle of significantly more complicated construction or by a plurality of parts manufactured with very close tolerances, can be realized in a simple manner. This is true especially for the example of the ball race 12, with an essentially completely smooth driving ball bearing surface, which is disposed concentrically with respect to the wall section 9 of the bearing body 8, the ball race 12 representing a simple rotating part. Axial displacement of the ball race 12 relative to the ball mechanism 10, 10' is controlled by an arresting mechanism is provided in the form of in each case an inner shoulder 12f shown in FIGS. 2, 3, 5 and 7. The inner shoulder 12f thus forms the ball race 12 slightly U-shaped in cross section and an inner leg spacing of which is constructed, so that the inner shoulder 12f in each case lies against the driving ball 10a or 10a' which is disposed outermost in the axial direction of the bearing body 8 and lies on the outside in the radial direction, that is, is guided by the inner shoulder 12f.

The bearing bores 11, which are constructed in the sleeve section of the bearing body 8 in the form of radially extending transverse boreholes, are dimensioned so that no further expensive means are required to ensure a necessary absence of clearance and so that the spindle 1, the bearing body 8 and the ball race 12 are slipped essentially loosely, that is, without clearance, into or onto one another, yet nevertheless are centered without wobbling.

For symmetry reasons and for reasons of improved force equalization, the apparatus described preferably has at least one further ball mechanism 10" which, like the ball mechanisms 10, 10' are mounted in corresponding bearing bores of the wall section 9. Moreover, the individual ball mechanisms 10, 10' 10" preferably are disposed at a radial interval of 120° to one another. At the same time, the additional ball mechanism 10" engages the corresponding driving balls 10a" and 10b" at a different place in the guiding grooves 5, 5' of the spindle 1, so that there is a sufficiently stable transfer of forces and the ball race 12 is held and centered concentrically on the bearing body 8 by a plurality of external driving balls 10a, 10a', 10a".

The apparatus described can be installed by initially pushing the ball race 12 onto the bearing body 8 and subsequently introducing the spindle 1 by rotation by introducing the corresponding driving balls 10a" and 10b" consecutively into the respective guiding groove.

During operation of the apparatus of FIG. 1, the spindle 1 is connected to a rotating mechanism, which is not shown, and rotated as required in the direction of the double arrow 4. This rotational movement is transferred over the guiding grooves 5, 5', the ball mechanism 10, 10' and the bearing bore 11 onto the bearing body 8 or the lifting part 6, as a result of which the bearing body 8 is moved back and forth in the direction of the double arrow v.

Because of the arresting mechanism that has been provided, it is now not possible, when the apparatus described is used, that the ball race 12, when the spindle 1 is rotated in the one or the other direction, is shifted parallel to the longitudinal axis 3 relative to the ball mechanism 10, 10' in such a manner, that the ball race 12 slides off from one of the driving balls 10a, 10a', etc. and then no longer biases the ball mechanism in question toward the guiding grooves 5, 5'. Rather, a reliable operation of the groove independently of the magnitude of the lifting motion is ensured.

Figure 2:
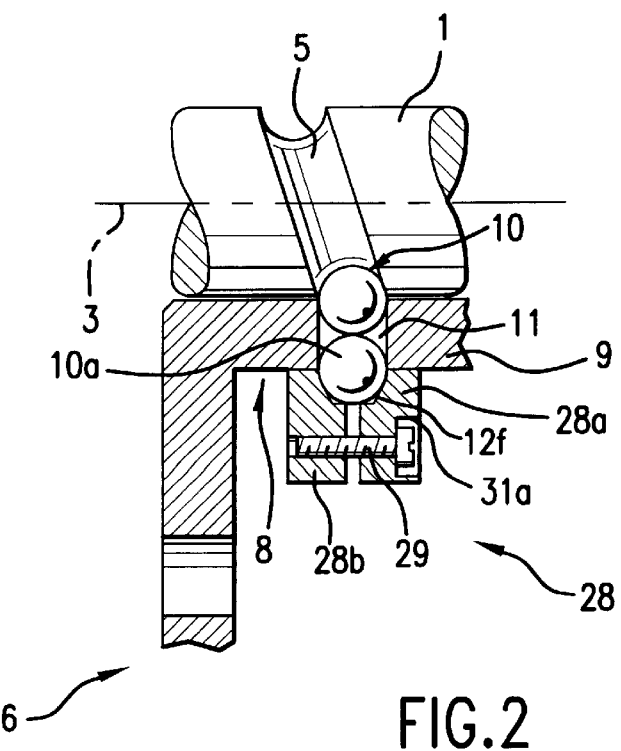
FIG. 2 shows a further example of an inventive ball roller spindle with a divided ball race.

In FIG. 2, a further example of the invention is shown, for which a divided ball race 28a, 28b is provided for at least one ball mechanism 10. The two parts 28a, 28b of the ball race, which are spaced apart in the direction of the longitudinal axis 3, are constructed so that they form an essentially trapezoidal groove in the operating position. As a result, the driving ball bearing surface 12e is constructed concentrically with the wall section 9 of the bearing body 8 or of the sleeve-shaped section of the bearing body 8. Each part 28a, 28b of the ball race furthermore has a part of the arresting mechanism, that is, a corresponding inner shoulder 12f. The two parts 28a, 28b of the ball race are connected together by at least one locking means, such as a locking or adjusting screw 29, which is disposed parallel to the longitudinal axis 3.

Similar to the construction of FIG. 1, an appropriate guiding groove 5 is formed in the spindle 1. The upper (radially outer) one of the pair of driving balls 10a, 10b, forming the ball mechanism 10, is guided in this spindle 1. Not only is it therefore possible to adjust pretension of the driving balls 10a, 10b by means of the screw 29, in that the two parts 28a, 28b are pulled against one another in the axial direction, but it is also possible, at any time, to readjust the ball mechanism 10 if there should be undesirable bearing clearance or play during the operation. Any wear, that may occur, can easily be compensated for by the readjustment, so that the service life of the inventive apparatus can be prolonged.

A further advantage of the apparatus of FIG. 2 is that the installation can be accomplished in a simple manner. For this purpose, for example, the bearing body 8 is first pushed onto the spindle 1. After that, the two parts 28a, 28b are pulled onto the bearing body 8 and disposed on either side of the bearing bore 11. Subsequently, the ball mechanism 10 is inserted from the outside into the bearing bore 11 in such a manner, that the inner driving balls 10b come to lie in the guiding groove 5. Finally, the two parts 28a, 28b are connected with one another by means of a screw 24 and braced with their bearing surfaces against the outer driving ball. If the apparatus of FIG. 2, at several places spaced apart parallel to the longitudinal axis 3, has ball mechanisms 10, 10', several balls 28, 28', etc. can correspondingly be provided and assigned in each case to one or more ball mechanisms.

Figure 3:
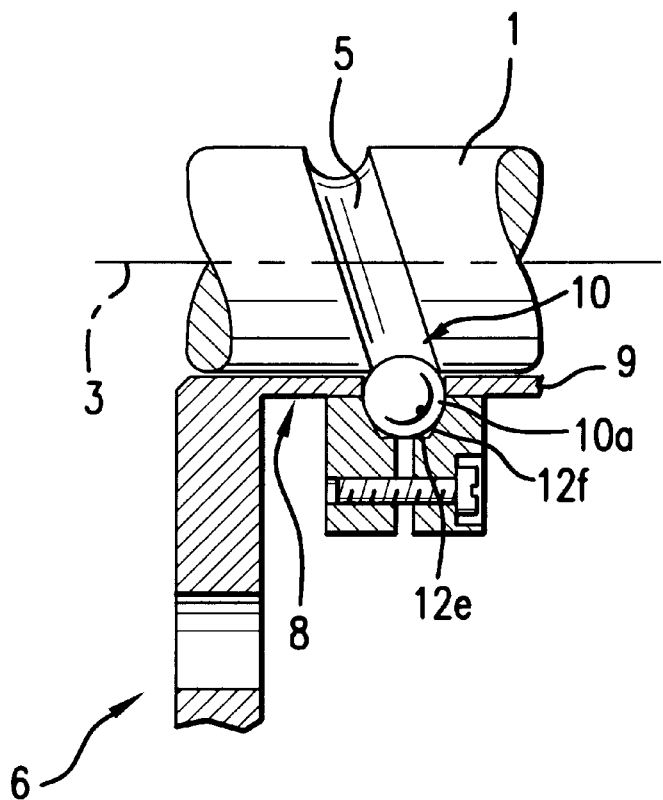
FIG. 3 shows a further example of an inventive ball roller spindle with a divided ball race and only one driving ball as the ball mechanism.

In FIG. 3, a further example is shown, which is based on that in FIG. 2. This example deviates from that shown in FIG. 2 in that the ball mechanism 10, instead of being a double arrangement, consists only of a single driving ball 10a. The advantage of this example consists therein that the ball mechanism can be constructed in a simpler fashion, which is meaningful particularly for those applications, for which the wall section 9 of the bearing body 8 or of the lifting part 6 can be constructed relatively thinly. The remaining parts of the apparatus correspond to those of FIG. 2.

Figure 4:
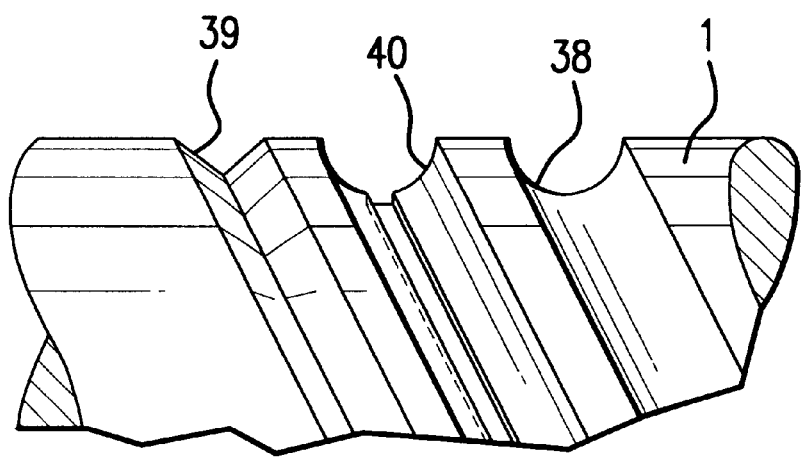
FIG. 4 shows a spindle with, for example, guiding grooves of a different design for accommodating the driving balls of the ball mechanism of the inventive ball roller spindle.

In FIG. 4, a diagrammatic representation of a spindle 1 is shown, in which guiding grooves 38, 39, 40 of different configurations are disposed. For the sake of simplicity, the different guiding grooves 38, 39, 40 are drawn in a single spindle 1. The guiding groove 38 has a semicircular cross section, as described already for the examples of FIGS. 1 and 2. For reasons of improved lubrication, an annular groove may be provided around the bottom region of the guiding groove and serve to accommodate a lubricating oil. Lubricating oil can be supplied over the interior of the spindle in a well-known manner. The guiding groove 39 has a V-shaped cross section. When driving elements in the form of driving balls are used, the V-shaped guiding on groove 39 has the advantage that the driving balls, 10a and 10b, have a point contact with legs of the V-shaped cross section of the guiding groove 39, as a result of which the friction between the spindle 1 and the driving balls, 10a and 10b, can be reduced. It is self-evident that the examples of the construction of the guiding grooves 38, 39, 40 are only given by way of example and that further shapes can be provided. For example, guiding grooves, which are adapted to nonspherical driving elements, are also possible.

Figure 5:
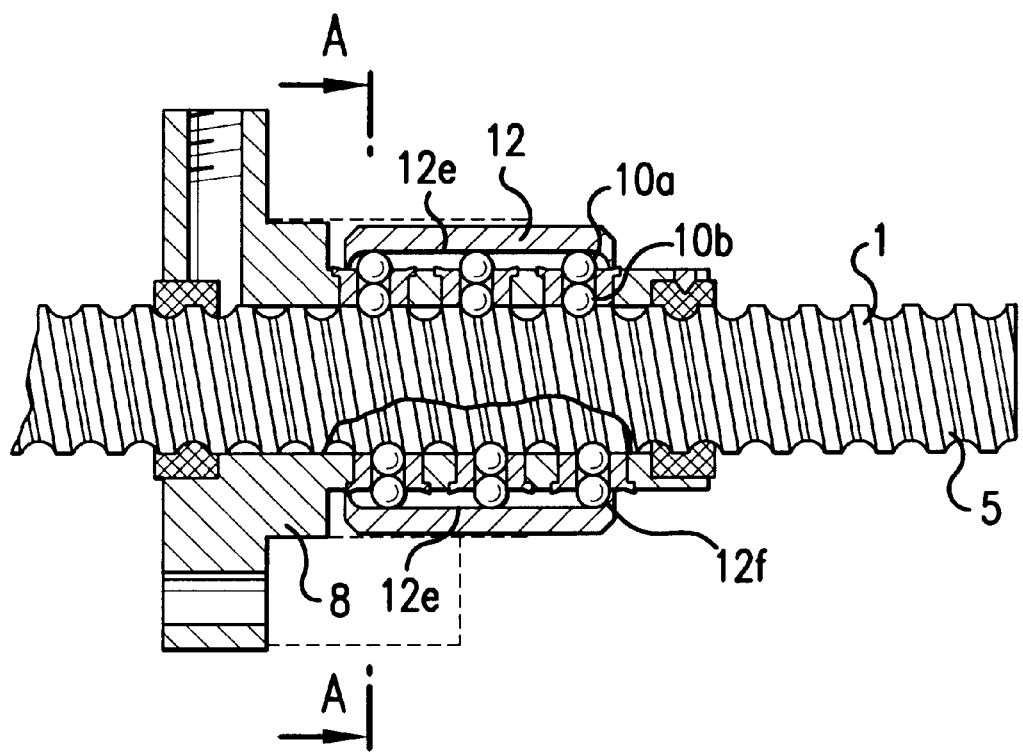
FIG. 5 shows a further example of the invention with slight guiding grooves introduced in the essentially concentric, cylindrical inner surface of the ball race.

A further example of the invention is shown in FIG. 5. The basic mode of functioning corresponds to that described in FIG. 1. For the example shown, the driving ball bearing surface 12a, which is disposed essentially concentrically to the wall section 9, is formed with very flat (only indicated) grooves, in which in each case at least one driving ball 10a of the ball mechanism 10 receives an at least slightly laterally directed guidance, that is, a guidance in the axial direction. Moreover, the ball race 12 has at each side an inner shoulder 12f, which serves as an arresting mechanism and prevents an axial movement of the ball race 12 with respect to the ball mechanism 10.

Such a construction is meaningful especially when the spindle 1 has a single guiding groove 5. In such a case, the mutually opposite ball mechanisms can easily be displaced in the axial direction, so that only the outer driving ball 10a of in each case one of the ball mechanisms, disposed furthest to the outside in the axial direction, lies against the respective inner shoulder 12f. By means of this construction, an axial movement of the ball race 12, relative to the bearing body 8, is reliably prevented.

Figure 6:
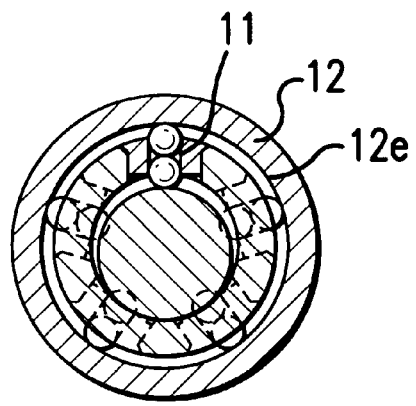
FIG. 6 shows a sectional representation along the line A—A of FIG. 5.

FIG. 6 represents a cross-sectional view through the line A—A of FIG. 5. It can be seen from this that, in the region of the bearing bores, sleeve-shaped inserts are disposed, which have the advantage that a material with a higher wear resistance can be used in the immediate vicinity of the bearing. On the other hand, the remaining part of the bearing body can be manufactured from conventional material at a lower cost. Moreover, FIG. 6 shows an arrangement of five ball mechanisms, spaced apart essentially at equal intervals along the periphery. The ball race 12 is constructed as a slotted ball race and can be put under tension with a tensioning device in the form of a screw, which is not shown. Due to the tensioning, an initial adjustment as well as a readjustment of the apparatus can be made as in the example of FIG. 2.

Figure 7:
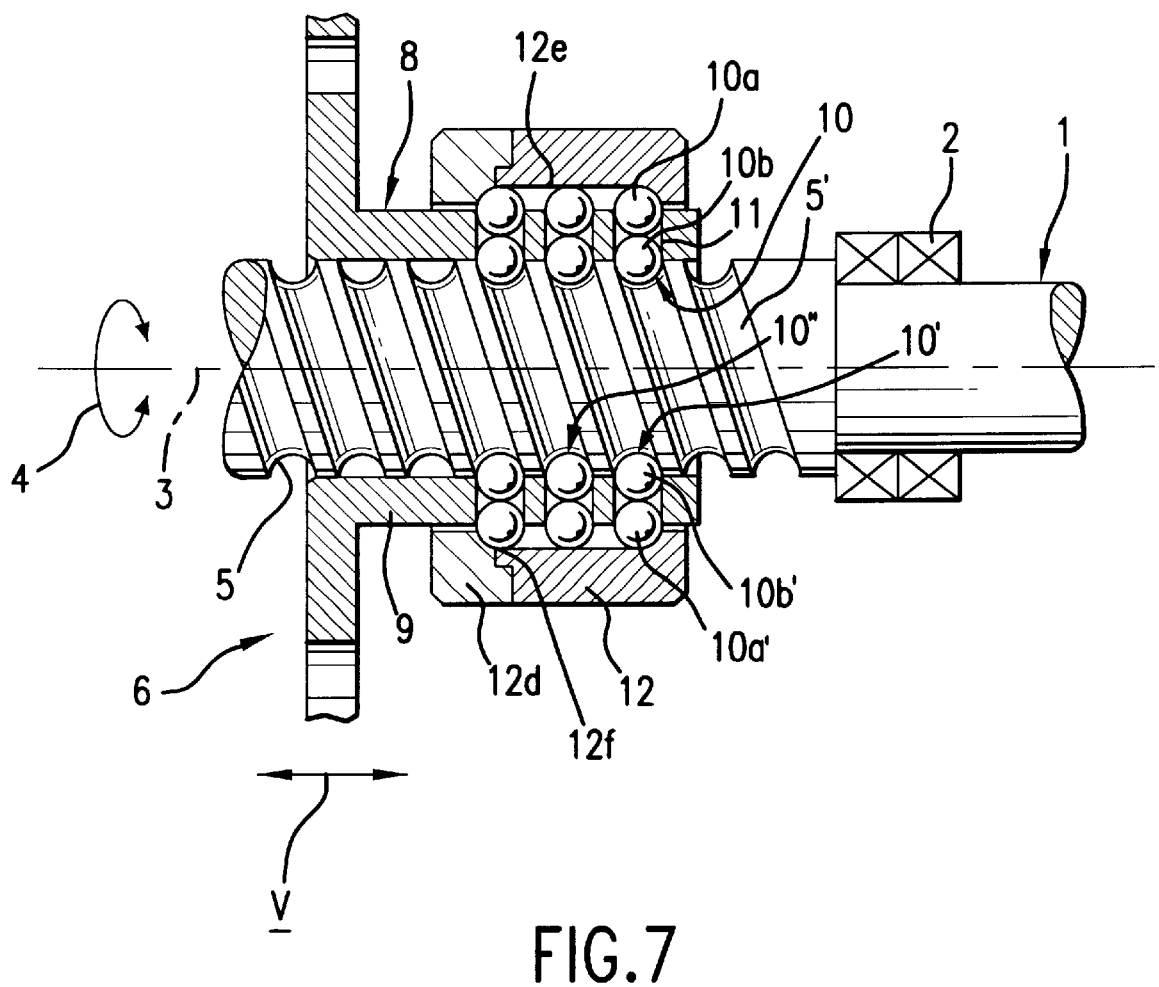
FIG. 7 shows a further example of an inventive ball roller spindle with a divided ball race.

In FIG. 7, a further example is shown, the basic structure of which corresponds to that of FIG. 1, but for which the ball race 12 is constructed not as a locking ring of FIG. 2, but as a two-part ball race. At its front end, the ball race 12 has an annular shoulder 12d, which can be connected detachably with known fastening devices with the ball race 12. In the installed state, this annular shoulder forms part of the ball race 12. It is, however, also possible to construct both annular shoulders as separate rings, so that the ball race 12 would consist in such a case of three parts.

The advantage of such a construction consists therein that the apparatus can be assembled more easily, in that the driving balls 10a, 10b; 10a', 10b' can be introduced from the outside through the bearing bores 11 of the bearing body 9 and that subsequently the ball race 12 can be pushed over the region of the bearing body, in which the driving balls are disposed. At the same time, the annular shoulders 12d or 12c (not shown) are constructed in such a manner, that the inner shoulder 12f is constructed congruently with respect to shape to the ball surface or as a simple inclined surface in the form of a conical surface.

The ball mechanisms of the apparatus can of course also be constructed in such a manner for all the examples shown, that one, two, three or more driving balls are provided for each individual ball mechanism.

What is claimed is:
1. An apparatus for converting a rotational movement into a back and forth movement, comprising:
    a spindle having an outer surface having at least one guiding groove;
    a bearing body having a wall section surrounding said outer surface concentrically, said spindle and said bearing body being rotatable and axially shiftable relative to one another, said wall section including bearing bores;
    a plurality of ball mechanisms each mounted in one of said bearing bores, said ball mechanisms protruding into one of said at least one guiding groove and beyond an outer surface of said wall section, each of said ball mechanisms including at least one driving ball;
    a ball race biasing said ball mechanisms in a direction toward said at least one guiding groove, said ball race being arranged around said bearing body and over said ball mechanisms, said ball race having a driving ball bearing surface with first and second axial ends, said driving ball bearing surface applying said bias to said ball mechanisms, and is substantially concentric with respect to said wall section; and
    said ball race having arresting surfaces at said first and second axial ends of said driving ball bearing surface and protruding radially inward thereof which are engageable with said ball mechanisms such that said ball race is fixed in position with respect to an axial movement relative to said ball mechanisms.

2. The apparatus of claim 1, wherein the arresting surfaces are inner shoulder surfaces of annular shoulders of said ball race, and said annular shoulders have a diameter which is smaller than a diameter of the driving ball bearing surface.

3. The apparatus of claim 2, wherein said inner shoulder surfaces include a spherical segment surface.

4. The apparatus of claim 2, wherein said inner shoulder surfaces include a surface that is congruent with respect to shape to the at least one driving ball.

5. The apparatus of claim 2, wherein said at least one of said annular shoulders is integrally connected to said ball race.

6. The apparatus of claim 2, said at least one of said annular shoulders is detachably fastened to said ball race.

7. The apparatus of claim 6, wherein said ball race is constructed as a locking ring, which is slotted in its longitudinal direction and said at least one of said annular shoulders is connected to a remainder of said ball race by means of a tensioning element.

8. The apparatus of claim 1, wherein said at least one guiding groove comprises two helical grooves.

9. The apparatus of claim 1, wherein at least one of said ball mechanisms each include a pair of driving balls.

10. The apparatus of claim 9, wherein one of said pair of driving balls protrudes into said at least one guiding groove and another of said pair of driving balls extends beyond said outer surface of said wall section.

11. The apparatus of claim 1, wherein said driving ball bearing surface is in contact with said ball mechanisms.

12. The apparatus of claim 1, wherein said driving ball bearing surface is a cylinder and arranged coaxial with a longitudinal axis of said spindle and more than one of said ball mechanisms are disposed axially displace from one another within said cylinder.

13. The apparatus of claim 1, wherein said bearing bores are radially extending transverse boreholes formed in said wall section.

14. The apparatus of claim 1, wherein said bearing bores are situated at different circumferential locations around the periphery of said wall section.

15. An apparatus for converting a rotational movement into a back and forth movement, comprising:
   a spindle having an outer surface having at least one guiding groove;
   a bearing body having a cylindrical wall section surrounding said outer surface, said spindle and said bearing body being rotatable and axially shiftable relative to one another, said wall section including bearing bores;
   a plurality of ball mechanisms each mounted in one of said bearing bores, said ball mechanisms protruding into one of said at least one guiding groove and beyond an outer surface of said wall section, each of said ball mechanisms comprising at least one driving ball;
   a ball race arranged around said bearing body and having a cylindrical inner surface in contact with all of said ball mechanisms, said ball mechanisms being biased toward said at least one guiding groove by said cylindrical inner surface; and
   said ball race having arresting surfaces at each end of said cylindrical inner surface, said arresting surfaces being in contact with different ones of said ball mechanisms thereby prevent axial displacement of said ball race relative to said bearing body.

16. The apparatus of claim 15, wherein said at least one guiding groove comprises two helical grooves.

17. The apparatus of claim 15, wherein at least one of said ball mechanisms comprises a pair of driving balls, one of said pair of driving balls protruding into said at least one guiding groove and the other of said pair of driving balls extending beyond said outer surface of said wall section.

18. The apparatus of claim 15, wherein said bearing bores are radially extending transverse boreholes formed in said wall section and are situated at different circumferential locations around the periphery of said wall section.

19. The apparatus of claim 15, wherein more than one of said ball mechanisms are disposed axially displaced from one another within said cylinder and contacted by said cylindrical inner surface.

* * * * *